United States Patent
Wang et al.

(10) Patent No.: US 10,532,551 B2
(45) Date of Patent: Jan. 14, 2020

(54) FOIL PEELING APPARATUS

(71) Applicant: KINSUS INTERCONNECT TECHNOLOGY CORP., Taoyuan (TW)

(72) Inventors: Shang-Chi Wang, Taoyuan (TW); Yun-Han Yeh, Taoyuan (TW); Cyuan-Bang Wu, Taoyuan (TW)

(73) Assignee: KINSUS INTERCONNECT TECHNOLOGY CORP., Taoyuan (TW)

(*) Notice: Subject to any disclaimer, the term of this patent is extended or adjusted under 35 U.S.C. 154(b) by 0 days.

(21) Appl. No.: 16/199,515

(22) Filed: Nov. 26, 2018

(65) Prior Publication Data

US 2019/0160805 A1 May 30, 2019

(30) Foreign Application Priority Data

Nov. 30, 2017 (TW) .............................. 106142015 A

(51) Int. Cl.
*B32B 43/00* (2006.01)
*B32B 38/10* (2006.01)

(52) U.S. Cl.
CPC ............ *B32B 43/006* (2013.01); *B32B 38/10* (2013.01); *Y10T 156/1168* (2015.01); *Y10T 156/1978* (2015.01); *Y10T 156/1989* (2015.01)

(58) Field of Classification Search
CPC . B32B 38/10; B32B 43/006; Y10T 156/1168; Y10T 156/1978; Y10T 156/1989

USPC .......................................... 156/714, 764, 767
See application file for complete search history.

(56) References Cited

U.S. PATENT DOCUMENTS

| | | | | | |
|---|---|---|---|---|---|
| 4,685,991 | A | * | 8/1987 | Herrmann | B26D 3/282 156/701 |
| 5,104,473 | A | * | 4/1992 | Tveit | B26D 3/282 156/268 |
| 5,282,918 | A | * | 2/1994 | Heist | B26D 3/282 156/765 |
| 6,227,276 | B1 | * | 5/2001 | Kim | B29C 63/0013 156/763 |
| 2008/0185100 | A1 | * | 8/2008 | Jang | B32B 43/006 156/714 |
| 2008/0236743 | A1 | * | 10/2008 | Kye | B29C 63/0013 156/714 |
| 2014/0020847 | A1 | * | 1/2014 | Burggraf | H01L 21/67092 156/714 |

* cited by examiner

*Primary Examiner* — Mark A Osele
*Assistant Examiner* — Nickolas R Harm
(74) *Attorney, Agent, or Firm* — Juan Carlos A. Marquez; Marquez IP Law Office, PLLC

(57) ABSTRACT

A foil peeling apparatus adapted to a substrate having a foil thereon includes a foil peeling member, a connector and a controller. The foil peeling member has a foil peeling surface. The controller controls the connector to drive the peeling member to move along a path. The foil peeling surface of the peeling member in contact with, with an initial angle, the substrate, feeds toward the substrate for a first displacement, and then moves upwards and toward the substrate when the first feeding angle is decreased.

17 Claims, 15 Drawing Sheets

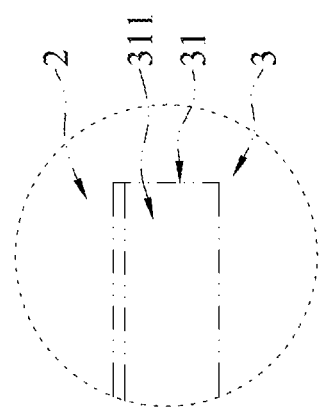

FOIL PEELING APPARATUS

CROSS-REFERENCE TO RELATED APPLICATION

This non-provisional application claims priority under 35 U.S.C. § 119(a) to Patent Application No. 106142015 filed in Taiwan, R.O.C. on Nov. 30, 2017, the entire contents of which are hereby incorporated by reference.

BACKGROUND

Technical Field

The present disclosure relates to a foil peeling apparatus adapted to peel a foil on a substrate.

Description of the Related Art

Nowadays, a foil on a substrate is to protect the surface of the substrate from damages as the substrate is transported or stacked by a robotic arm. Current apparatuses for peeling the foil from the substrate are generally classified into two types including a cutting foil peeling apparatus and a tapping foil peeling apparatus.

The cutting foil peeling apparatus is adapted for a substrate having a first Cu foils on a surface thereof and a second Cu foils on another surface thereof. First, the substrate is arranged on a worktable, and then two corners of the substrate are cut along a thickness direction of the substrate until the corresponding corners of one of the Cu foils are remained. Next, the first Cu foil is removed from the surface of the substrate by pulling the remained corner of the first cu foil, and then the substrate is flipped over. Last, the second Cu foil is removed from the another surface of the substrate.

The tapping foil peeling apparatus generally has a tapping module and a nozzle module. The tapping module has elastic peeling sheets. The elastic peeling sheets are driven by a variable speed dynamic device to rotate and to tap an edge of the protective film of a substrate until the edge of the protective film being peeled from the substrate. The nozzle module then blows the peeled edge until the film is entirely peeled off.

SUMMARY

Regarding the cutting foil peeling apparatus, the thickness of the first Cu foils may be different from that of the second Cu foils. The Cu foils may be cut off or damaged during the corner-cut step such that the foil peeling step likely fails in consequence of the damaged corners of the foils. In summary, the cutting foil peeling apparatus is not suitable for different substrates with different thickness. Regarding the tapping foil peeling apparatus, the edge of the substrate is repeatedly taped by elastic peeling sheets, to that end, the edge is easily damaged. Next, the edge of the protective film is gradually raised by the elastic peeling sheets' repeated tapped. However, the raised edge of the film falls down a little bit at the period of time between two consecutive taps. Hence, the cutting foil peeling apparatus is not efficient enough and the edge of substrate is damaged more than necessary.

To address this issue, a foil peeling apparatus is provided. According to an embodiment of the present disclosure, a foil peeling apparatus, adapted to peel a foil on a first surface of a substrate, the substrate having a corner between a first edge and a second edge from a top view of the substrate. The foil peeling apparatus includes a foil peeling member, a connector and a controller. The foil peeling member has a foil peeling surface. The connector is connected to the foil peeling member. The controller is configured for controlling the connector to move the peeling member along a path. The path includes a first path segment, connected to a second path segment. When the foil peeling member is moved along the first path segment, the foil peeling surface is in contact with, with an initial angle between the foil peeling surface and the first surface from a side view, the corner. The initial angle is between the foil peeling surface and the first surface, from the side view of the substrate. Next, the foil peeling member moves toward a first feeding direction for a first feeding displacement. The first feeding direction is upwards and toward the substrate. When the foil peeling member, along the second path segment, moves toward a second feeding direction for a second feeding displacement, the initial angle is decreased to a second feeding angle. In detail, the second feeding direction is upward and toward the substrate and the second feeding angle is, from the side view of the substrate, between the foil peeling surface and the first surface. Therefore, the foil peeling apparatus can peel foils off effectively on different substrates with different thickness.

In an embodiment of the present disclosure, after the foil peeling member is moved along the first feeding direction for the first feeding displacement, the initial angle is decreased to a first feeding angle between the foil peeling surface and the first surface. When the foil peeling member is moved along the second path segment, an angle between the foil peeling surface and the first surface is decreased from the first feeding angle to the second feeding angle.

In an embodiment of the present disclosure, from the top view of the substrate, a first edge angle between the foil peeling surface and the first edge is decreased to zero when the foil peeling member is moved along the first path segment.

In an embodiment of the present disclosure, from the top view of the substrate, a first edge angle between the foil peeling surface and the first edge is decreased to zero when the foil peeling member is moved along the second path segment.

In an embodiment of the present disclosure, from the top view of the substrate, a first edge angle is between the foil peeling surface and the first edge. More specifically, the path further comprises a third path segment, connected to the second path segment. When the foil peeling member is moved along the third path segment, the first edge angle is decreased to zero.

In an embodiment of the present disclosure, when the foil peeling member is moved along the first path segment, an top edge angle, between the foil peeling surface and the first edge from the top view of the substrate, is decreased from a first preset value to a second preset value. When the foil peeling member is moved along the second path segment, the top edge angle is decreased from the second preset value to zero.

In an embodiment of the present disclosure, the foil peeling apparatus further comprises a second foil clamping member, having a second gripper and connected to the connector. After the first gripper, gripping the corner of the raised foil, is moved toward the first peeling direction for the first peeling displacement, a larger portion of the raised foil is apart from the substrate by the first gripper, and the controller controls the second gripper to grip the larger portion of the raised foil between the first gripper and the substrate. The controller then controls the first and the second foil clamping member to move toward diagonally the first peeling direction, another opposite corner of the substrate. In addition to that the corner of the raised foil being gripped by the first foil clamping member, the larger portion of the raised foil is gripped by the second foil clamping member. Accordingly, the gripped foil apart from the substrate is prevented from damage until the foil peeled off from the substrate.

The following embodiment describes in detail features and advantages of the present disclosure, of which the contents are sufficient for any skilled in the relevant art to understand the technical content of the present disclosure and accordingly embodiment, and in accordance with the present specification, the appended claims and drawings. Any person skilled in the relevant art can easily understand object of the present disclosure and the related advantages.

BRIEF DESCRIPTION OF THE DRAWINGS

The disclosure will become more fully understood from the detailed description given herein below for illustration, and thus not limitative of the disclosure.

FIG. 1A illustrates a partially enlarged view of the substrate according to FIG. 1.

DETAILED DESCRIPTION

Figure 1:
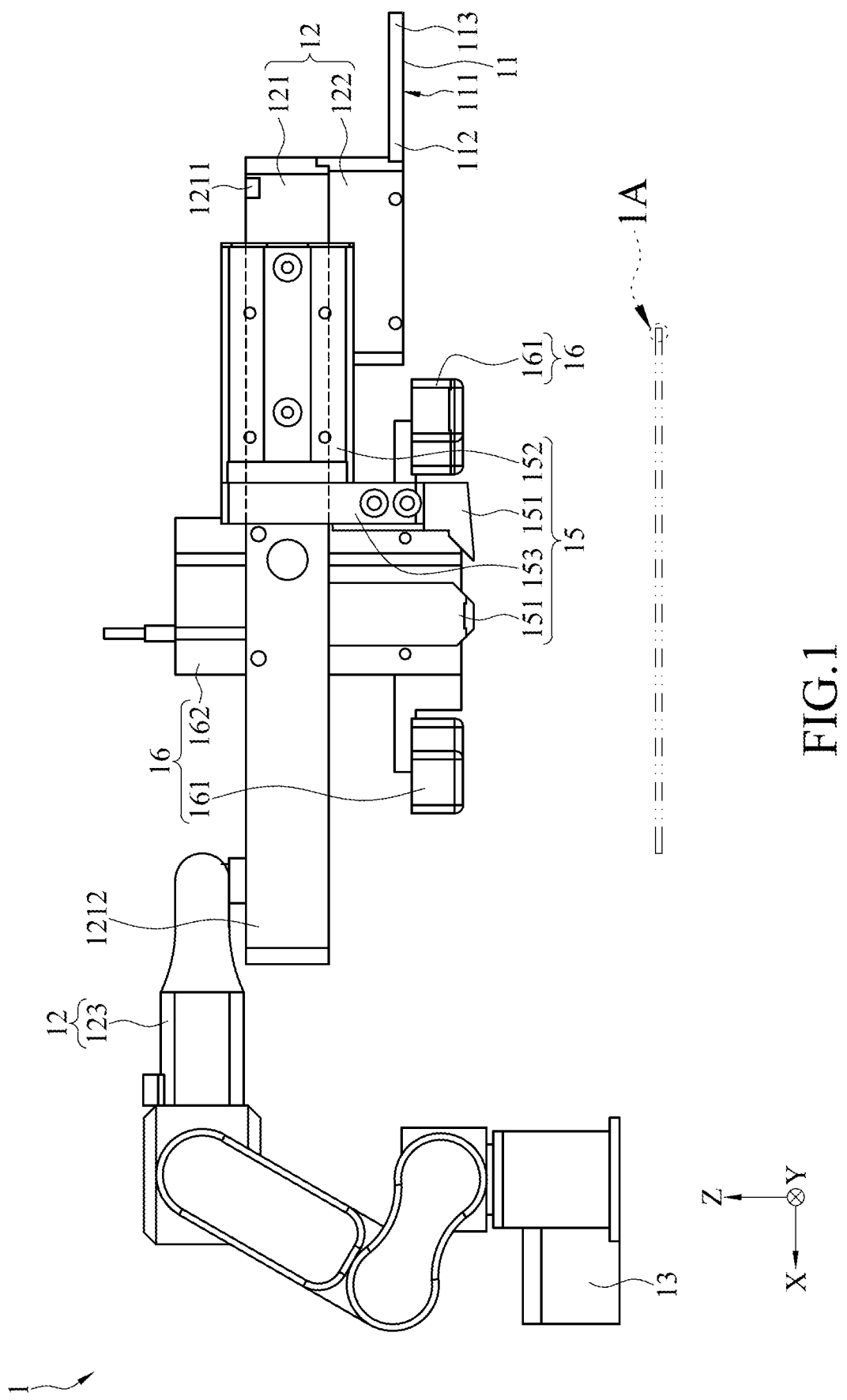
FIG. 1 illustrates a structure diagram of a foil peeling apparatus according to an embodiment of the present disclosures.

Please refer to FIGS. 1 and 1A. FIG. 1 illustrates a structure diagram of a foil peeling apparatus according to an embodiment of the present disclosure. FIG. 1A illustrates a partially enlarged view of the substrate according to FIG. 1. The foil peeling apparatus 1 adapted to peel a foil 2 on a first surface of a substrate 3. The substrate 3 has a corner between a first edge 311 and a second edge 312 from a top view. The foil peeling apparatus 1 includes a foil peeling member 11, a connector 12 and a controller 13. The foil peeling member 11 has a foil peeling surface 111. The connector 12 is connected to the foil peeling member 11, and the controller 13 is connected to the connector 12, such that the controller 13 is configured for controlling the connector 12 to move the foil peeling member 11 along a path.

Figure 2:
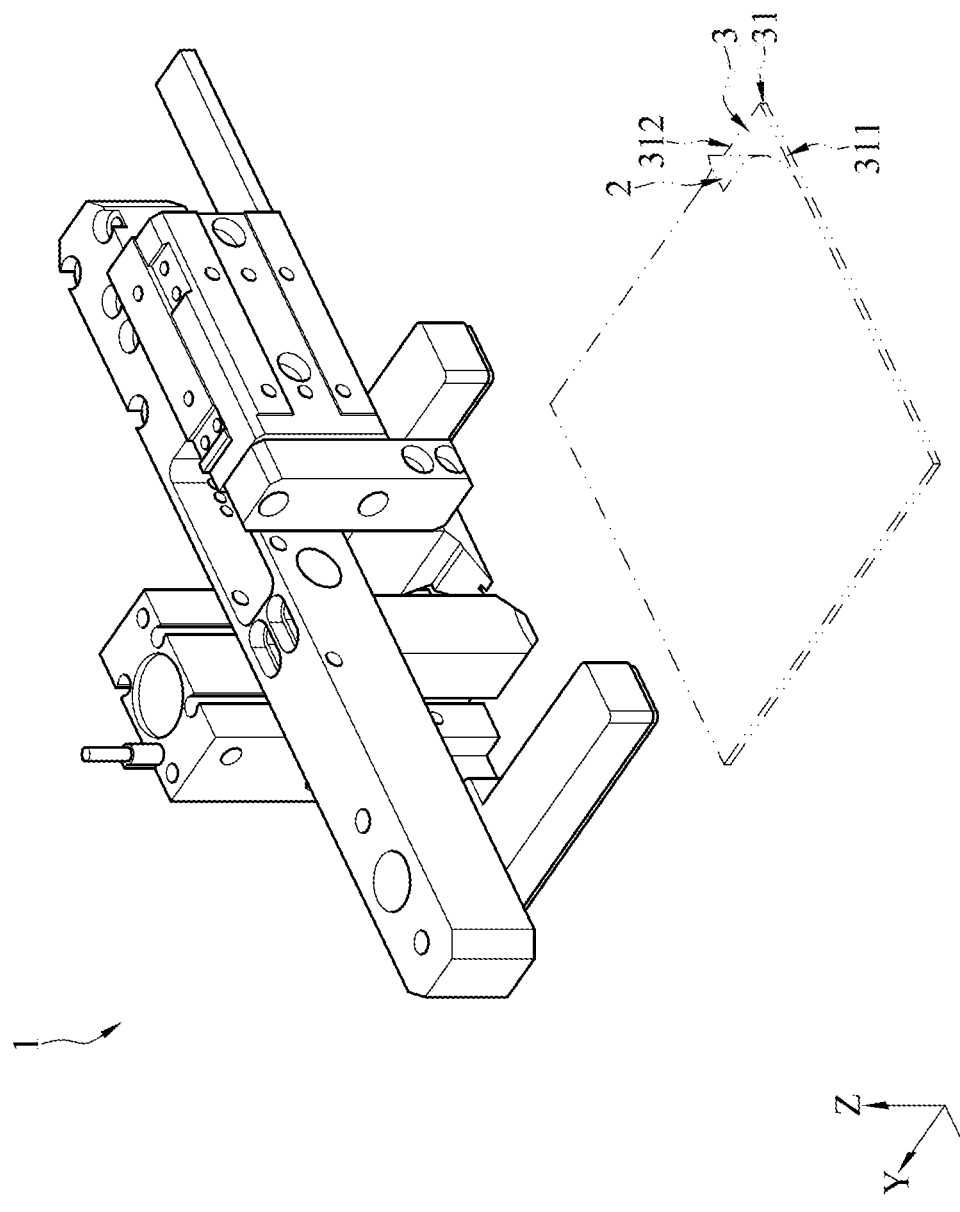
FIG. 2 illustrates a perspective view of the substrate according to FIG. 1.

Please refer to FIG. 2. FIG. 2 illustrates a perspective view of the substrate according to FIG. 1. The substrate 3 has four corners as shown in FIG. 2. One of four corners is an angle between the first edge 311 and the second edge 312.

Please refer to FIG. 1 and FIG. 2, in one embodiment, the substrate 3 may be made from inorganic materials or organic materials. For example, inorganic substrates are, but not limited to, ceramic substrates, metal substrates or other substrates. The ceramic substrates are, but not limited to, alumina substrates, aluminum nitride substrates, silicon carbide substrates, low temperature fired substrates or other ceramic substrates. The metal substrates are, but not limited to, copper/aluminum metal base substrates, copper/aluminum metal core substrates. The other substrates are a glass substrate or a silicon substrate. On the other hand, The organic substrate are a paper-phenolic based copper clad laminate, a glass based copper clad laminate, a composite copper clad laminate or a copper clad thermoplastic laminate. The paper-phenolic based copper clad laminate is an epoxy resin copper clad laminate, a polyester copper clad laminate or a phenolic resin copper clad laminate. The glass based copper clad laminate is a glass fiber copper clad laminate, an epoxy resin copper clad laminate or a polyester fiber copper clad laminate. The composite copper clad laminate is a glass epoxy copper clad laminate, a non-woven glass copper clad laminate, or an epoxide synthetic glass fiber copper-clad laminate. The copper clad thermoplastic laminate is a poly-based resin, polyetherimide resin or a polyetheretherketone resin. The flexible copper-clad laminate is a polyester copper clad laminate, an oxygen resin, a poly-arylene copper clad laminate or liquid crystal polymer copper clad laminate.

Please refer to FIG. 2. The foil 2 on the first surface of the substrate 3 is, but not limited to, a copper foil being bound to the first surface of the substrate 3 by an adhesion, such that the foil 2 prevents the moved substrate 3 from damage. Until the corner 31 of the foil 2 being raised from the first surface of the substrate 3, the foil peeling member 11 contacts and rubs the corner 31. In the disclosure, one or more directional term(s), such as up, down, left, right, front, rear, on or under, etc., is/are used with respect to the accompanying drawings. Thus, the directional term(s) should not be interpreted to limit the scope of the disclosure in any manner. It is also belong to the scope of appended claims by changing a relative position of members in the accompanying drawings.

Figure 3:
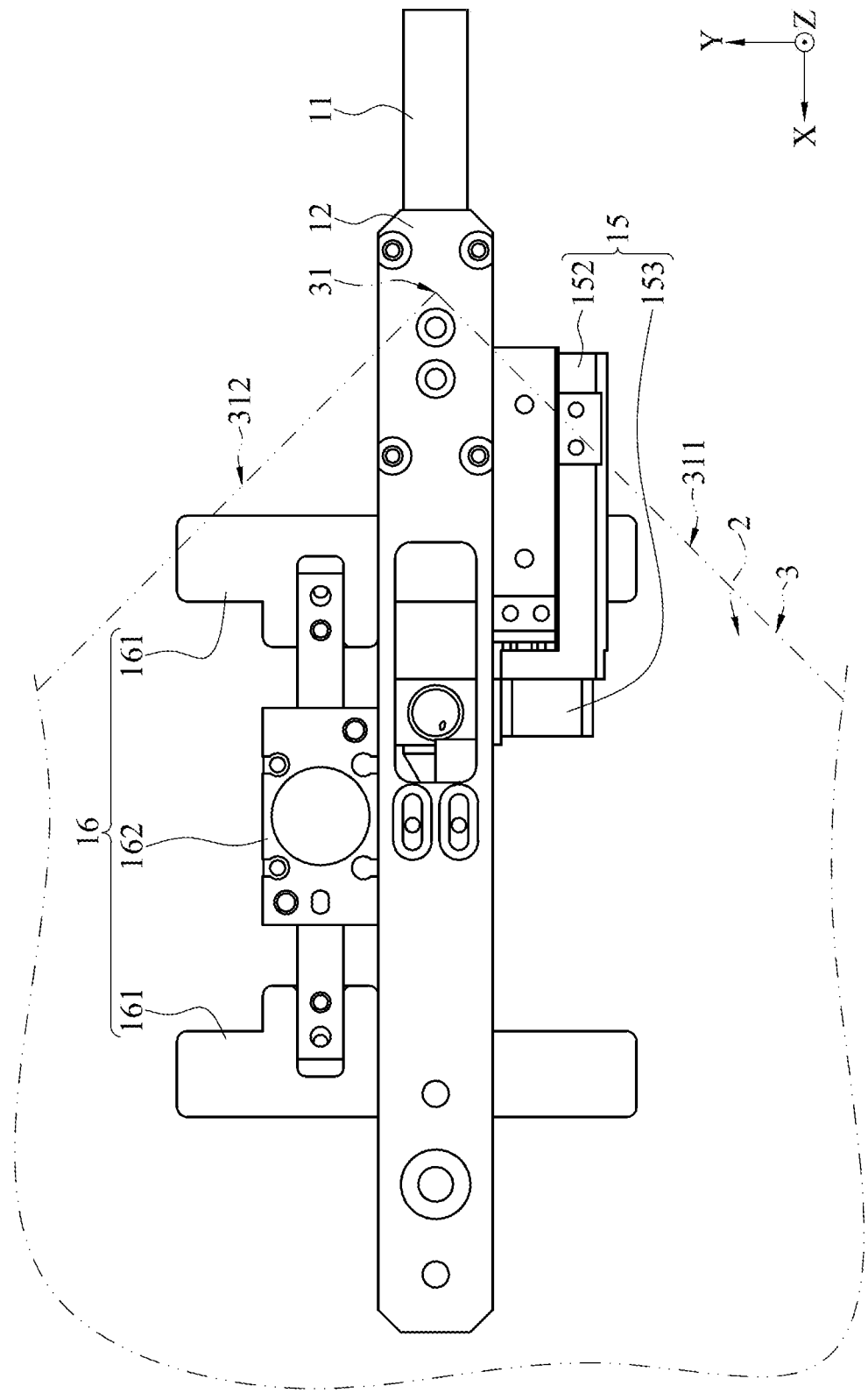
FIG. 3 illustrates a top view of the substrate according to FIG. 1.
Figure 4:
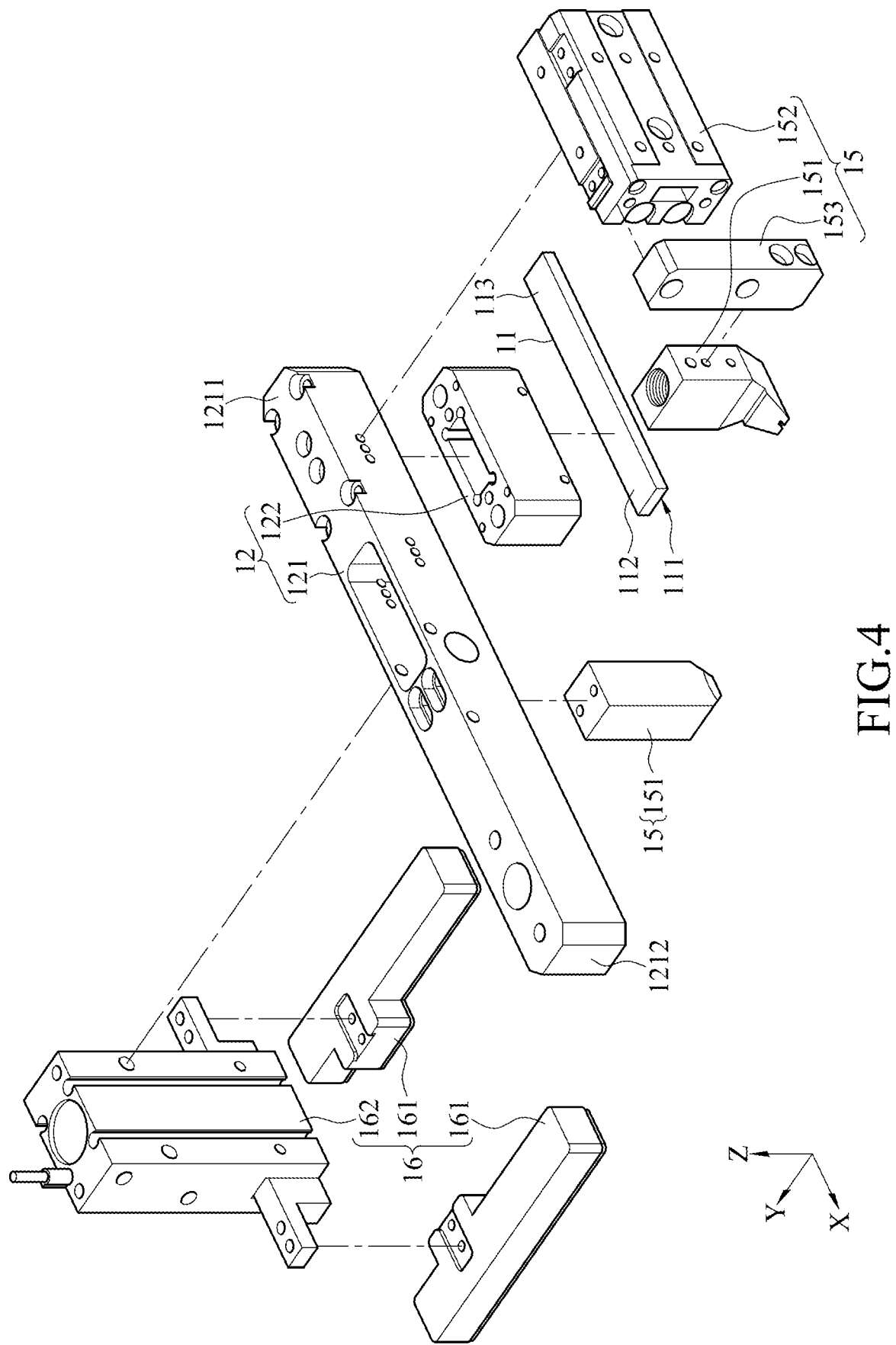
FIG. 4 illustrates an exploded diagram of the foil peeling apparatus according to FIG. 1.

Please refer to FIGS. 1-4. FIG. 3 illustrates a top view of the substrate according to FIG. 1. FIG. 4 illustrates an exploded diagram of the foil peeling apparatus according to FIG. 1. The foil peeling member 11 is but not limited to a plate, a rectangular plate, a circular plate, a triangle plate, a diamond plate or a plate of any shape. In addition, the foil peeling member 11 is made from the foregoing inorganic materials or organic materials.

Please refer to FIGS. 1 and 4. In one embodiment, the foil peeling member 11 has a foil peeling surface 111. More specifically, the foil peeling surface 111 is a surface toward the substrate 3 for contacting the foil 2 or the first surface of the substrate 3. For example, the foil peeling surface 111 is a surface on the foil peeling member 11 that is toward the substrate 3 for contacting the substrate 3 and the foil 2.

Please refer to FIG. 1. The foil peeling member 11 has a foil peeling surface 111, every portion of which may contact the substrate 3 and the foil 2, the foil peeling surface 111 as well as the foil peeling member 11 has a fixed end 112 and a free end 113. In one embodiment, the fixed end 112 is one end of the foil peeling surface 111, and the free end 113 is the other end of the foil peeling surface 111. The fixed end 112 on the one end of the foil peeling surface 111 in a longitudinal direction that is connected to the connector 12, and the free end 113 on the other end of the foil peeling surface 111 in a longitudinal direction that is to contact with the foil 2 on the substrate 3. the longitudinal direction is an X-axis direction, or a horizontal direction, of FIG. 1 as well. Furthermore, the foil peeling surface 111 between the fixed end 112 and the free end 113 is referred to as a default length of the foil peeling member 11. According to the default length, the controller 13 controls the foil peeling member 11 to move along the path with the connector 12, such that the foil peeling surface 111 starts contact with the corner 31 at the fixed end 112 and stops contact with the corner 31 at the free end 113. Especially, the default length is the distance on the foil peeling surface 111 between the point where the foil peeling member 11 starts contact with the corner and the point where the foil peeling member 11 stops contact with the corner during the movement of the foil peeling member 11 along the path. For example, if the length of the foil peeling surface 111 is 40 mm, the default length on the foil peeling surface 111 is not less than 10 mm and not greater than 40 mm.

Figure 14:
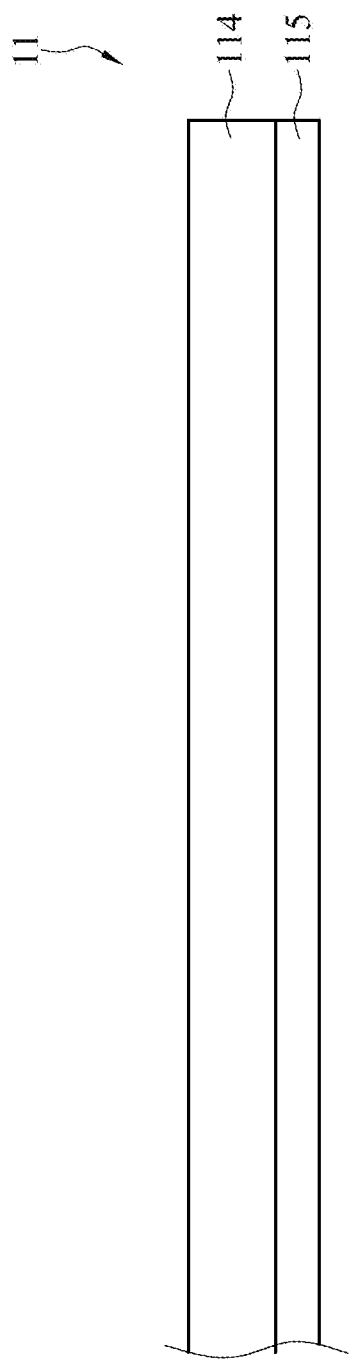
FIG. 14 illustrates a structure diagram of a second embodiment of a foil peeling member.

Please refer to FIG. 14. FIG. 14 illustrates a structure diagram of a second embodiment of a foil peeling member 11. In one embodiment, the foil peeling member 11 further includes a body 114 beneath an elastomer 115. When the foil peeling member 11 is moved toward the substrate 3, a surface of the elastomer 115 facing the first surface of the substrate 3 can be in contact with the first surface of the substrate 3 or the foil 2. More specifically, during the foil peeling member 11 moves along the path, the surface of the elastomer 115 faces as well as contacts the foil 2 on the first surface of the substrate 3.

In one embodiment, the foil peeling member 11 can be an elastomer. A surface of the elastomer can be in contact with the foil 2 on the first surface of the substrate 3, especially the corner of the foil 2, after the controller 13 controls the elastomer to move to the corner 31 of the substrate 3 above.

Please refer to FIGS. 1-4. In one embodiment, the connector 12 includes a main beam 121 and a fixed member 122. In the longitudinal direction of the main beam 121, a first end 1211 is connected to the fixed end 112 of the foil peeling member 11 and a second end 1212 is connected to an arm member 123 that are of the main beam 121. Furthermore, the fixed member 122 is connected between the first end 1211 and the foil peeling member 11 (see FIG. 4), that is, the foil peeling member 11 connected the main beam 121 with the fixed member 122. In another embodiment, the fixed member 122 is connected to the first end 1211 and the foil peeling member 11 (see FIG. 1).

In one embodiment, the connector 12 includes a six-axis motion platform, such as an arm member 123, connected to the second end 1212 of the main beam 121. For example, the six-axis motion platform may move separately along the X-axis, the Y-axis or the Z-axis in the Cartesian coordinate system and rotate separately along the X-axis, the Y-axis or the Z-axis. In another embodiment, a plurality of arm members 123 is of the six-axis motion platform. One of the arm members 123 is connected to the second end 1212 of the main beam 121, and the others of the arm members 123 are nearby the One of the arm members 123 or connected to the controller 13. The controller 13 controls an arm member 123, such that the arm member(s) drives/drive the foil peeling member 11 to move along the X-axis, the Y-axis or the Z-axis. In addition, the arm member(s) drives/drive the foil peeling member 11 to rotate the foil peeling member 11 along the X-axis, the Y-axis or the Z-axis. The arm member 123 moves along the X-axis and the Z-axis to the corner 31 of the substrate 3 above, and then rotates clockwise about the Y-axis with the second end 1212 of the main beam 121. Therefore, the foil peeling surface 111 is gradually close to the corner 31 of the substrate 3 until the foil peeling surface 111 in contact with the corner 31 of the substrate 3. In addition, from the side view of the substrate, the foil peeling surface 111 and the first surface of the substrate 3 are parallel or non-intersection until the foil peeling member 11 in contact with the corner 31. For example, the foil peeling surface 111 is vertically in contact with the first surface of the substrate 3 from the side view of the substrate. The foil peeling surface 111 also tilts an angle between the first surface and the foil peeling surface 111 to contact obliquely the first surface of the substrate 3 from the side view of the substrate. On the contrary, rotating the angle toward the corner 31, the foil peeling surface 111 may not contact with the corner 31 of the substrate 3.

In the disclosure, one or more directional term(s), such as move, shift, rotation, etc., is/are used with respect to the accompanying drawings. Thus, the directional term(s) should not be interpreted to limit the scope of the disclosure in any manner. It is also belong to the scope of appended claims by changing a relative position of members in the drawings. In one embodiment, from the top view of the substrate 3, when the controller 13 controls the connector 13 to move the foil peeling member 11, the foil peeling member 11 is parallel with the first surface of the substrate 3, as well as shifting toward the first surface of the substrate 3 and then the foil peeling member 11 rotates around the X-axis. In one embodiment, from the top view of the substrate 3, the foil peeling member 11 rotates around an axis (as the X-axis, the Y-axis or the Z-axis), or rotates around the tilted axis.

Please refer to FIGS. 1-4. In one embodiment, the controller 13 is coupled to the arm member 123, that is, the controller 13 connected electrically to the arm member 123 or connected communically to the arm member 123. As shown FIG. 1, the controller 13 is electrically connected to the arm member 123 for controlling the arm member 123 to move along the path with the foil peeling member 11. In addition, the controller 13 includes a communicator, a storage unit and a processor. The communicator receives or transmits control commands. The storage unit stores a motion database including path information and control information. The processor recognizes the control commands to generate the control information associated with the path information, and then the processor controls the connector 12 to move the foil peeling member 11 along the path including a first path segment, connected to a second path segment.

The following embodiments illustrate that the foil peeling member 11 moves along a path. For example, the first embodiment refers to FIGS. 5-7, 15A and 15B, the second embodiment refers to FIGS. 8-9, 16A and 16B, the third embodiment refers to FIGS. 10, 19A and 19B, the fourth embodiment refers to FIGS. 17A and 17B, the fifth embodiment refers to FIGS. 18A and 18B, the sixth embodiment refers to FIGS. 20A and 20B.

In first embodiment (see FIG. 15A) and second embodiment (see FIG. 16A), the first edge angel is a default constant. For example, the first edge angel may be a first preset value $\phi_1$, a second present value $\phi_2$, or zero. When the foil peeling member 11 is moved along the first path segment, the top edge angle is decreased from a first preset value $\phi_1$ to a second preset value $\phi_2$. When the foil peeling member is moved along the second path segment, the top edge angle is decreased from the second preset value $\phi_2$ to zero. In the disclosure, one or more directional term(s), such as an initial angle $\theta_0$, a first feeding angle $\theta_1$, a second feeding angle $\theta_2$, a first preset value $\phi_1$ and a second present value $\phi_2$, is/are used to illustrate a variation of these angles with respect to the accompanying drawings. When each of these edge angles $\phi_1$, $\phi_2$, $\theta_0$, $\theta_1$ and $\theta_2$ is substantially equal to zero, the transversal line 1111 of the foil peeling member 11 is substantially line-contact with the substrate 3. These feeding angles $\theta_1$, $\theta_2$ may increase continuously or discontinuously as well as decrease continuously or discontinuously. Thus, these angles should not be interpreted to limit the scope of the disclosure in any manner. It also belongs to the scope of appended claims by changing a relative position of members in the drawings.

Figure 5:
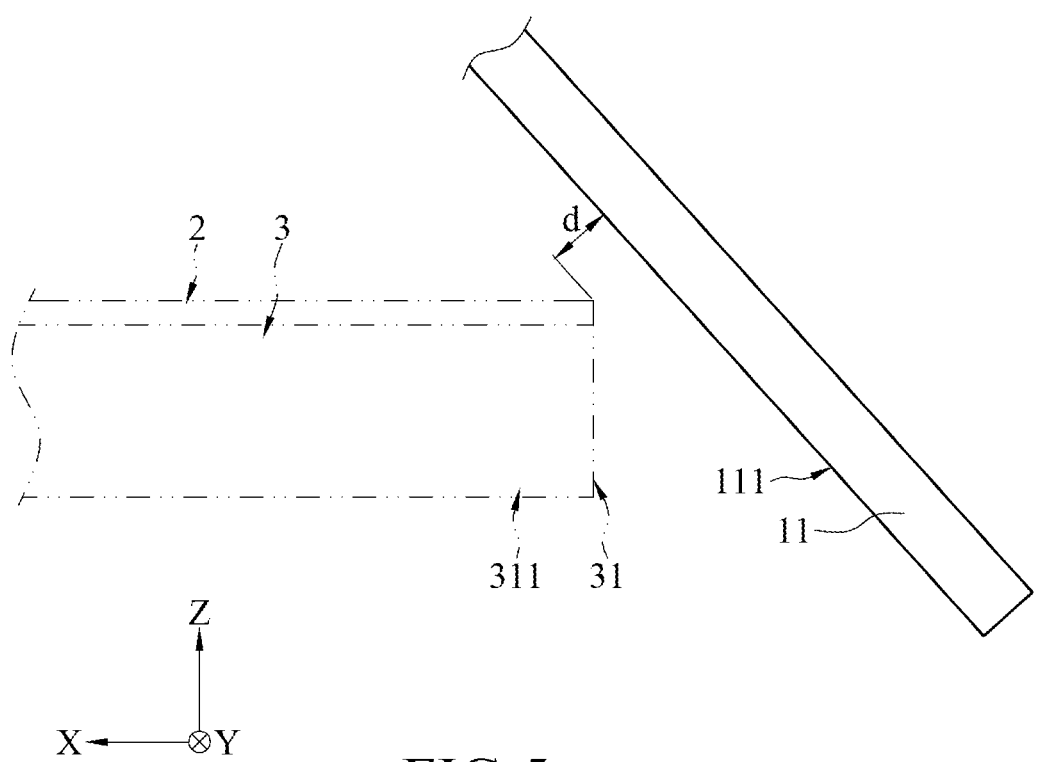
FIG. 5 illustrates a movement diagram (1) of a foil peeing member moved along a first path segment from a side view of the substrate according to FIG. 1.
Figure 6:
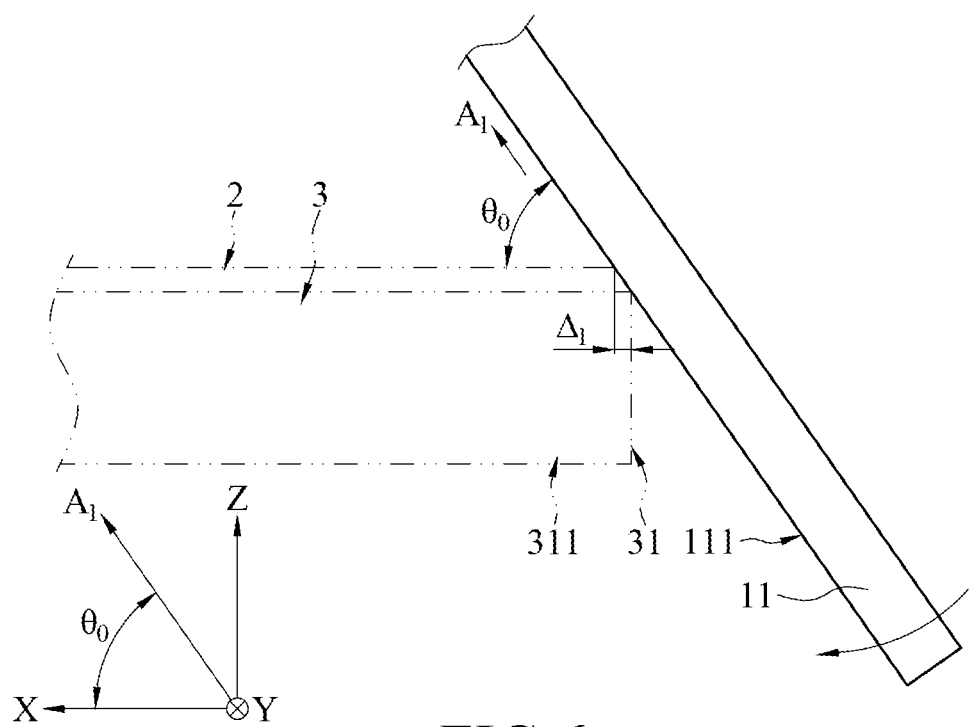
FIG. 6 illustrates a movement diagram (2) of a foil peeing member moved along a first path segment from the side view of the substrate according to FIG. 1.
Figure 7:
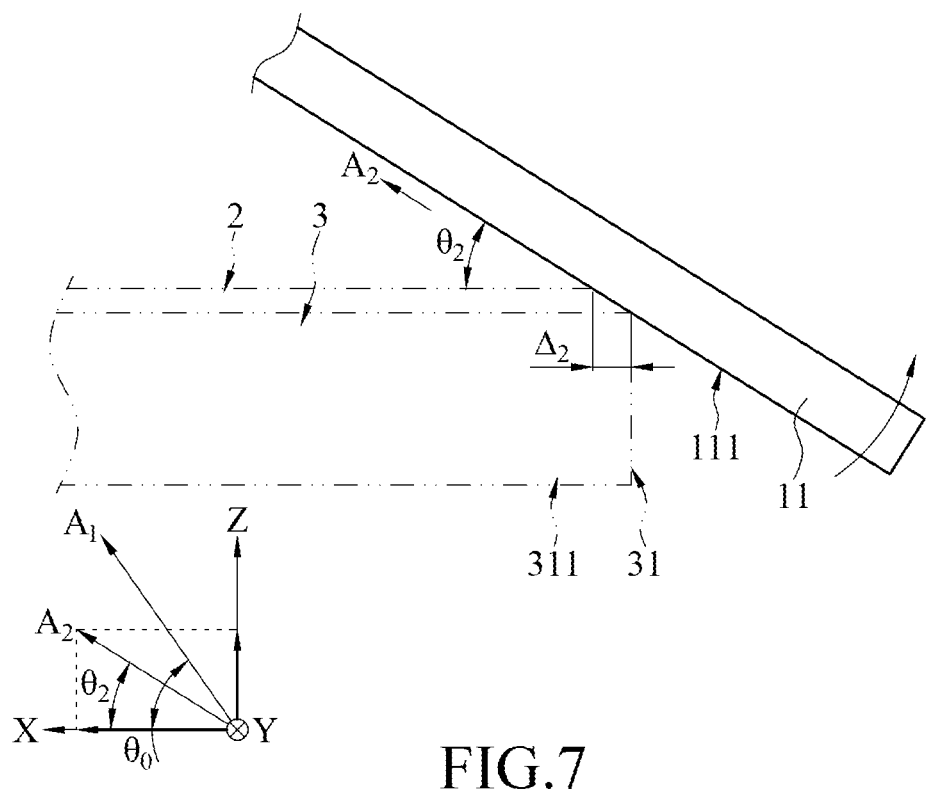
FIG. 7 illustrates a movement diagram (1) of a foil peeing member moved along a second path segment from the side view of the substrate according to FIG. 1.

FIGS. 5-7 illustrate the first embodiment of the foil peeling member 11 moved along the path. In the first embodiment, as shown in FIGS. 5 and 6, the foil peeling member 11 moves along the first path segment. As shown in FIG. 7, the foil peeling member 11 then moves along the second path segment. Moving along the first path segment, the foil peeling member 11 tilts an initial angle $\theta_0$ between the surface of the foil peeling member 11 and the surface of the corner 31, in order to contact with the corner 31 of the substrate 3 and move toward a first feeding direction $A_1$, upwards Z and toward the substrate 3. Thus, during the foil peeling member 11 toward the first surface of the substrate 3 rubs the contacted corner 31 on the substrate 3, the foil peeling surface 111 moves a first feeding displacement $\Delta_1$ to raise the corner of the foil 2. Regarding the first feeding displacement $\Delta_1$, it is a distance of the rub foil peeling surface 111 starting from a rub point to the other rub point along the first feeding direction $A_1$. In addition, the first feeding direction $A_1$ may be any different directions or any different angles, and the first feeding displacement $\Delta_1$ is, but not limited to, a shortest distance between the rub point and the other rub point of the rubbed foil peeling surface 111.

Please refer to FIG. 5. FIG. 5 illustrates a movement diagram (1) of a foil peeing member 11 moved along the first path segment from the side view of the substrate 3 according to FIG. 1. In the embodiment, the controller 13 controls the connector 12 to drive the foil peeling member 11 to move along the first path segment, for example, the foil peeling member 11 moves above the corner 31 of the substrate 3. The controller 13 controls the connector 12 to rotate the foil peeling member 11 around the Y-axis, such that the foil peeling surface 111 is close to the surface of the fixed end and in contact with the corner 31 of the substrate 3. More specifically, the foil peeling surface 111 faces the corner 31 from the top view of the substrate 3 and gradually closes to the corner 31 until the foil peeling surface 111 in contact with the corner 31, in order to rub and contact the corner of the foil 2 on the corner 31 of the substrate 3. In addition, from the side view of the substrate 3 as shown in FIG. 5, a default distance, a distance between the foil peeling surface 111 and the corner of the foil 2, is but not limited to a shortest distance, such as 0-1.5 mm.

Figure 15A:
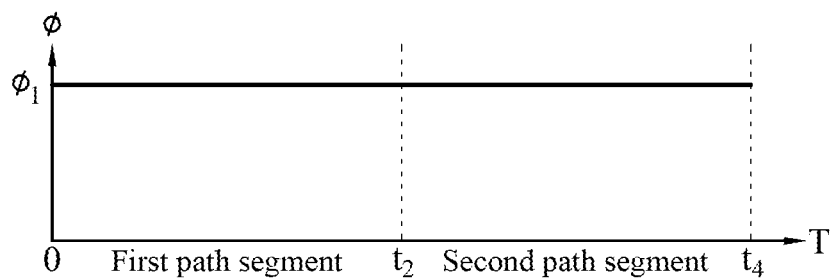
FIG. 15A illustrates a timing diagram (1) of a path of a first embodiment according to FIG. 1.
Figure 15B:
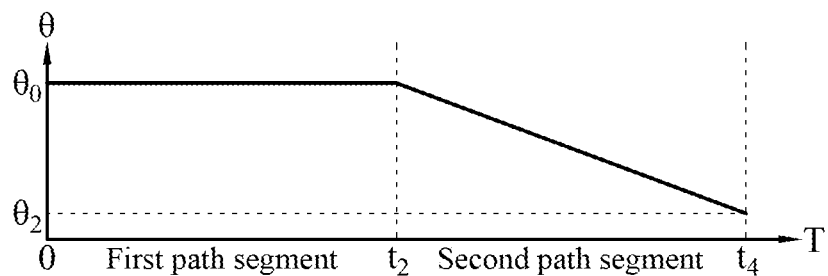
FIG. 15B illustrates a timing diagram (2) of a path of a first embodiment according to FIG. 1.

Please refer to FIGS. 6 and 15B. FIG. 6 illustrates a movement diagram (2) of the foil peeing member 11 moved along a first path segment from the side view of the substrate 3 according to FIG. 1. FIG. 15B illustrates a timing diagram (2) of a path of a first embodiment according to FIG. 1. In the embodiment, in contact with the corner 31 of the substrate 3, the foil peeling surface 111 rotates the initial angle $\theta_0$ around the Y-axis. In addition, the initial angle $\theta_0$ is but not limited to 60°, or is not greater than 60° and is not less than 25°. The controller 13 controls the foil peeling member 11 to rotate clockwise around the Y-axis with the second end 1212, such that the foil peeling member 11 contacts obliquely the corner 31 of the substrate 3 with the initial angle $\theta_0$. In other words, the foil peeling surface 111 tilts an initial angle $\theta_0$ to contact obliquely the corner of the foil 2 and thus moves toward and upwards the substrate 3 for the first feeding displacement $\Delta_1$, such that the foil peeling surface 111 contacts and rubs the corner of the foil 2. For example, at a period from time t0 to time t1, the foil peeling member 11 starts to contact the corner 31 with the initial angle $\theta_0$ from an original point of the first path segment, an area of the foil peeling surface 111 close to the fixed end 112. Next, The foil peeling surface 111 moves toward a first feeding direction $A_1$ for rubbing the foil 2 along the first feeding displacement $\Delta_1$, in order to raise the foil 2, especially the corner of the foil 2. In addition, the range of the first feeding displacement $\Delta_1$ is not less than 0 mm and is not greater than 1 mm.

Please refer to FIG. 6. In one embodiment, the foil peeling surface 111 does not contact the corner 31 of the substrate 3, even though the foil peeling member 11 rotates clockwise around the Y-axis with the second end 1212. Controlled by the controller 13, the foil peeling member 11 moves along the X-axis and contacts the corner 31 with the initial angle $\theta_0$. Afterwards, moving toward first feeding direction $A_1$, upwards and toward the substrate 3, and contacting obliquely the corner 31 with the initial angle $\theta_0$ for the first feeding displacement $\Delta_1$, the foil peeling surface 111 rubs and raises the corner 31 of the substrate 3, especially, the corner of the foil 2.

Please refer to FIGS. 7 and 15B. FIG. 7 illustrates a movement diagram (1) of a foil peeing member 1 moved along a second path segment from the side view of the substrate 3 according to FIG. 1. In the embodiment, the second path segment is connected to the first path segment. An initial angle $\theta_0$ is an angle between the foil peeling surface 111 and the surface of the corner 31 from the side view of the substrate 3. A second feeding direction $A_2$ is upwards and toward the substrate 3. A second feeding displacement $\Delta_2$ is a distance that the foil peeling surface 111 rubs and contacts the corner 31 with the second feeding angle $\theta_2$. On moving along the second path segment, the foil peeling member 111 contacts and rubs obliquely for moving toward the second feeding direction $A_2$ for the second feeding displacement $\Delta_2$, such that initial angle $\theta_0$ is decreased gradually decreased to a second feeding angle $\theta_2$. Therefore, a rub point or a rub direction of the foil peeling surface 111 is varied with the second feeding angle $\theta_2$ and the second feeding displacement $\Delta_2$. The following content illustrates in detail the movement of the foil peeling member 11 according the FIG. 7.

FIG. 7 illustrates a movement diagram (1) of a foil peeing member moved along a second path segment from the side view of the substrate 3 according to FIG. 1. The foil peeling member 11, through the connector 12, moves along the second feeding direction $A_2$ for the second feeding displacement $\Delta_2$ when the controller 13 controls the connector 12. At the same time, the foil peeling member 11 rotates counterclockwise around the Y-axis with the second end 1212 of the main beam 121. Therefore, the initial angle $\theta_0$ is gradually decreased to the second feeding angle $\theta_2$, for example, the second feeding angle $\theta_2$ is equal to 25° and less than 60°. In addition, the second feeding displacement $\Delta_2$ may not be greater than the first feeding displacement $\Delta_1$, but also not greater than the first feeding displacement $\Delta_1$. At a period from time t2 to time t3, the foil peeling member 11 moves along the second feeding direction $A_2$ for the second feeding displacement $\Delta_2$, and rotates counterclockwise around the Y-axis with the second end 1212 of the main beam 121, such that the initial angle $\theta_0$ is gradually decreased to the second feeding angle $\theta_2$. In addition, the second feeding displacement $\Delta_2$ is greater than 1 mm, and less than 8 mm. At a period from time t3 to time t4, the foil peeling member 11 tilts the second feeding angle $\theta_2$ in contact with the corner 31 and moves along the second feeding direction $A_2$ for the second feeding displacement $\Delta_2$. Thus, the foil peeling member 11 moves to the destination point of the foil peeling surface 111, another area of the foil peeling surface 111 close to the free end 113, along the second path segment.

Figure 8:
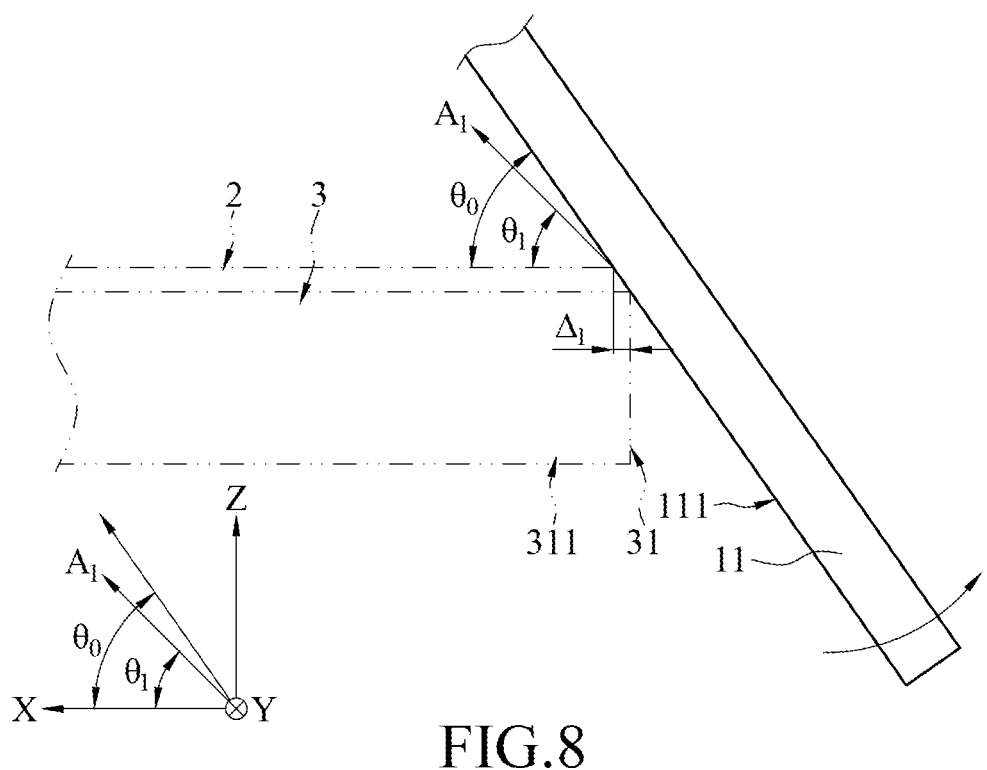
FIG. 8 illustrates a movement diagram (3) of a foil peeing member moved along a first path segment from the side view of the substrate according to FIG. 1.
Figure 9:
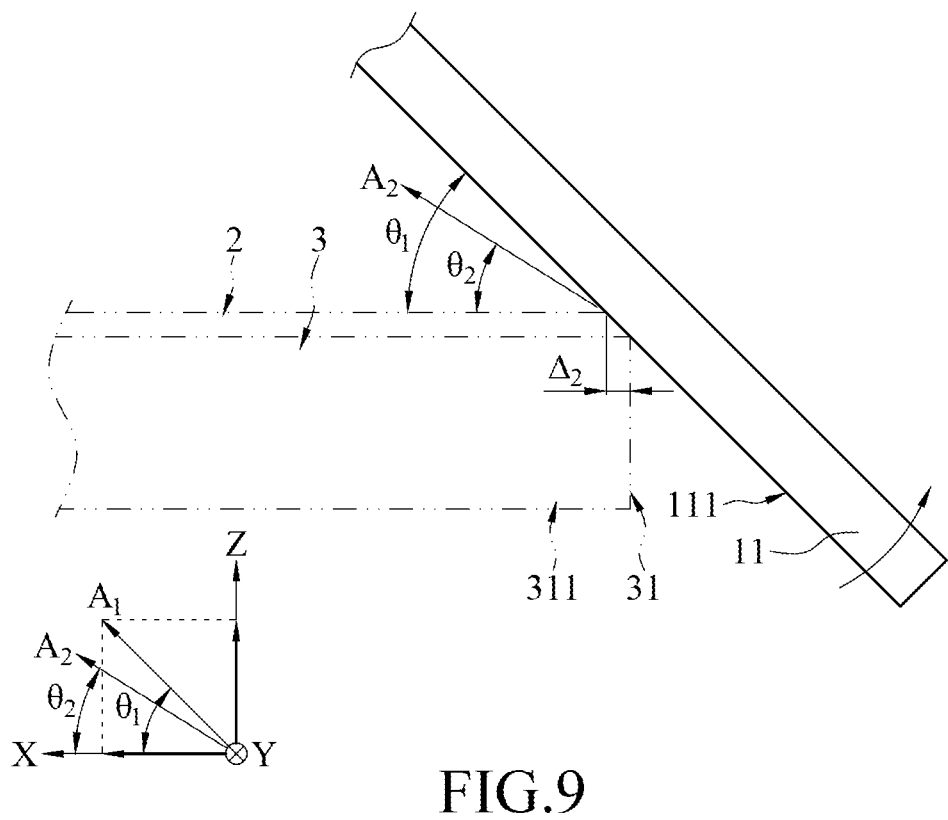
FIG. 9 illustrates a movement diagram (2) of a foil peeing member moved along a second path segment from the side view of the substrate according to FIG. 1.

FIGS. 8 and 9 illustrate the second embodiment of the foil peeling member 11 moved along a path. In the embodiment, the foil peeling member 11 moves along the first path segment according to FIG. 8, and the foil peeling member 11 moves sequentially along a second path segment according to FIG. 9.

Figure 16A:
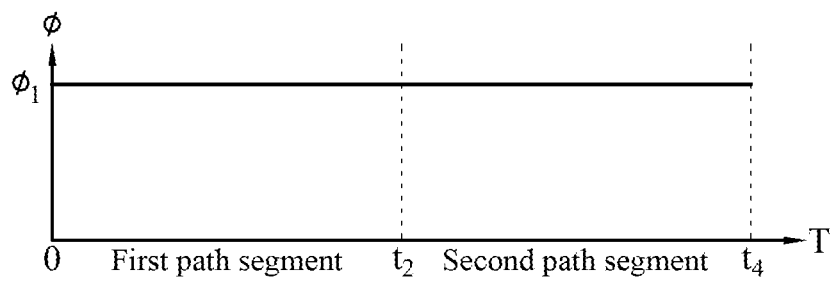
FIG. 16A illustrates a timing diagram (1) of a path of a second embodiment according to FIG. 1.
Figure 16B:
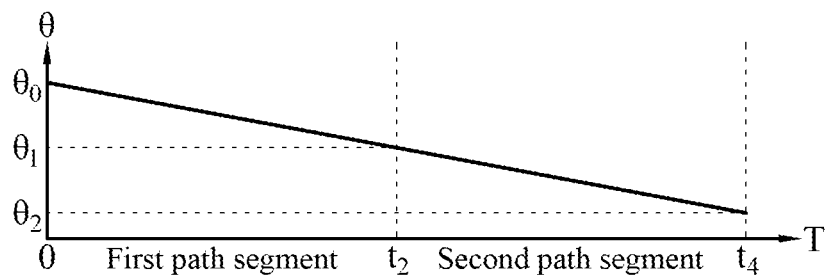
FIG. 16B illustrates a timing diagram (2) of a path of a second embodiment according to FIG. 1.

Please refer to FIGS. 8 and 16B. FIG. 8 illustrates a movement diagram (3) of a foil peeing member 11 moved along a first path segment from the side view of the substrate 3 according to FIG. 1. FIG. 16B illustrates a timing diagram (2) of a path of a second embodiment according to FIG. 1. When the controller 13 controls the connector 12 to move the foil peeling member 11 along the first path segment, the foil peeling member 11 moves toward a first feeding direction $A_1$ for a first feeding displacement $\Delta_1$ and an initial angle $\theta_0$ is gradually decreased to a first feeding angle $\theta_1$. For example, the connector 12 includes one or more arm member(s). Driven by an arm member 123, the foil peeling member 11 moves along the first feeding direction $A_1$ for the first feeding displacement $\Delta_1$ and rotates counterclockwise around the Y-axis with the second end 1212 of the main beam 121. Thus, the initial angle $\theta_0$ is gradually decreased to the first feeding angle $\theta_1$ to contact and rub obliquely the corner 31. For example, at a period from time t1 to time t2, on moving the first path segment, the foil peeling member 11 contacts the corner 31 of the substrate 3 toward the first feeding direction $A_1$ for the feeding displacement $\Delta_1$. At the same time, the foil peeling member 11 rotates around the Y-axis with the second end 1212 of the main beam 121 to decrease the initial angle $\theta_0$ to the first feeding angle $\theta_1$. In addition, a range of the first feeding angle $\theta_1$ is not less than 25° and not greater than 60°.

Please refer to FIGS. 9 and 16B. FIG. 9 illustrates a movement diagram (2) of a foil peeing member 11 moved along a second path segment from the side view of the substrate 3 according to FIG. 1. When the foil peeling member 11, along the second path segment, moves toward a second feeding direction $A_2$ for a second feeding displacement $\Delta_2$, the first feeding angle $\theta_1$ is decreased to the second angle $\theta_2$. For example, the foil peeling member 11 connected to the connector 12 moves toward the second feeding direction $A_2$ with the second feeding displacement $\Delta_2$ when the controller 13 controls the arm member 123. At the same time, the foil peeling member 11 is to rotate counterclockwise about the Y-axis with the second end 1212 of the main beam 121. Thus, the first feeding angle $\theta_1$ is decreased to the second feeding angle $\theta_2$. For example, at a period from time t2 to time t4, the foil peeling member 11 moves the foil peeling member 11 toward the second feeding direction $A_2$ for the second feeding displacement $\Delta_2$. At the same time, the foil peeling member 11 rotates counterclockwise around the Y-axis with the second end 1212 of the main beam 121 so as to decrease the first feeding angle $\theta_1$ to the second feeding angle $\theta_2$.

Please refer to FIGS. 7 and 9. In one embodiment, the foil peeling member 11 moves along the second path segment. The foil peeling member 11 rotates clockwise around the Y-axis with the second end 1212 of the main beam 121 and moves toward the second feeding direction $A_2$ for the second feeding displacement $\Delta_2$. Therefore, the initial angle $\theta_0$ (or the first feeding angle $\theta_1$) increases to the second feeding angle $\theta_2$, which is greater than the initial angle $\theta_0$ or the first feeding angle $\theta_1$, for example, the second feeding angle $\theta_2$ is greater than 60°.

Figure 10:
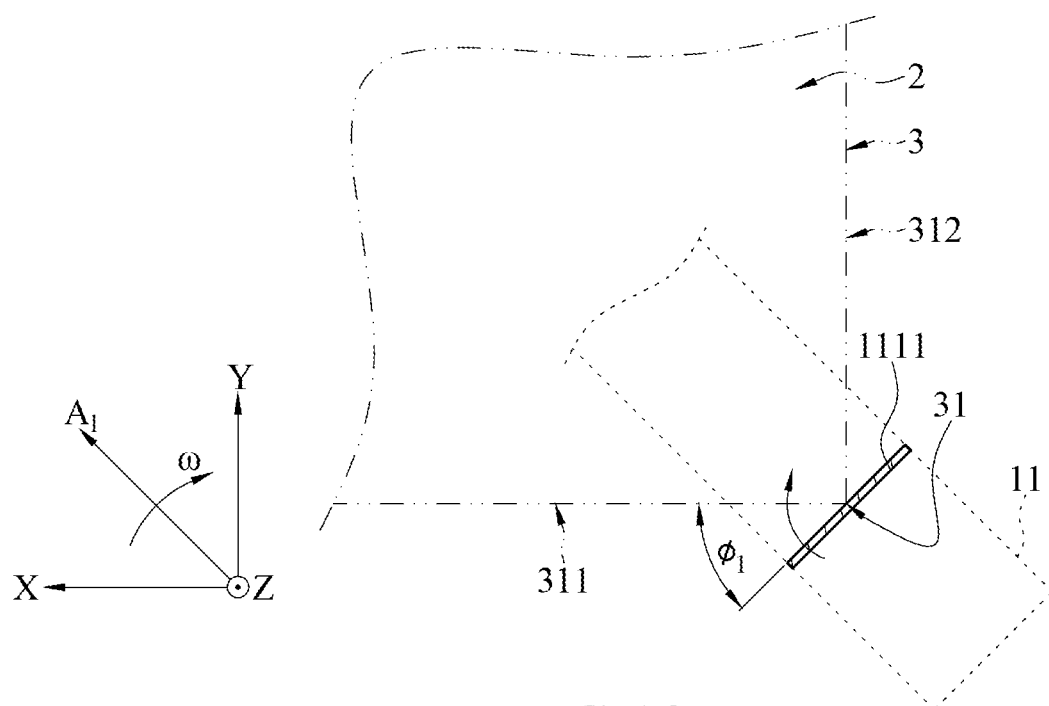
FIG. 10 illustrates a movement diagram (1) of a foil peeing member moved along a third path segment from the top view of the substrate according to FIG. 1.
Figure 11:
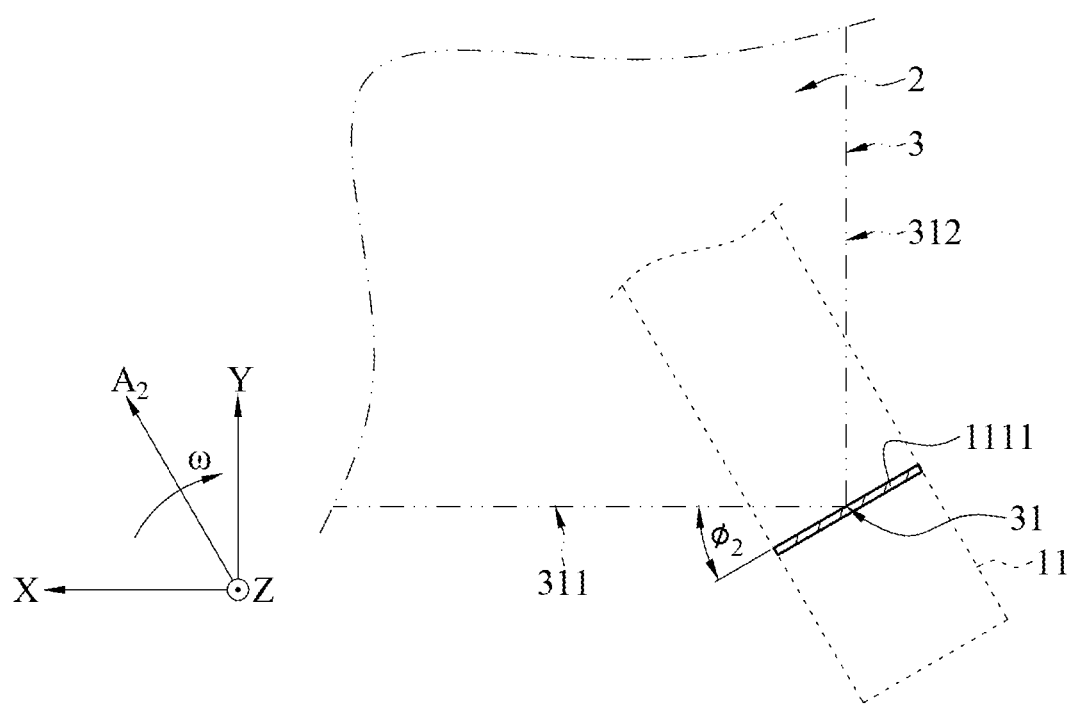
FIG. 11 illustrates a movement diagram (2) of a foil peeing member moved along a third path segment from the top view of the substrate according to FIG. 1.
Figure 19A:
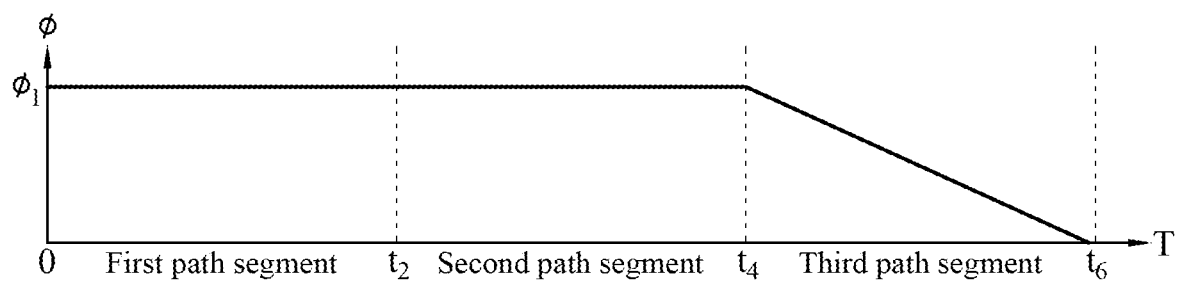
FIG. 19A illustrates a timing diagram (1) of a path of a third embodiment according to FIG. 1.
Figure 19B:
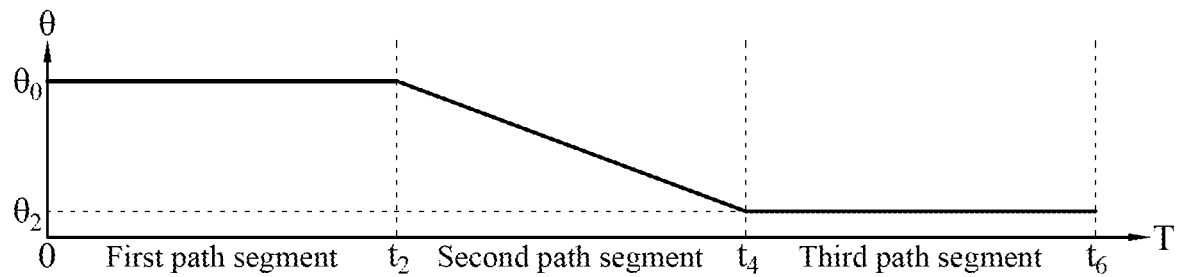
FIG. 19B illustrates a timing diagram (2) of a path of a third embodiment according to FIG. 1.

FIGS. 10, 19A and 19B illustrate the third embodiment of the foil peeling member 11 moved along the path. FIG. 10 illustrates the movement diagram (1) of a foil peeing member moved along the third path segment from the top view of the substrate according to FIG. 1. FIG. 19A illustrates the timing diagram (1) of the path of the third embodiment according to FIG. 1. FIG. 19B illustrates the timing diagram (2) of the path of the fifth embodiment according to FIG. 1. The path further includes a third path segment, connected to the second path segment. The foil peeling member 11 moves sequentially along the third path segment according to FIG. 10.

When the foil peeling member 11 is moved along the third path segment, the first preset value $\phi_1$ is decreased to zero, that is, the first preset value $\phi_1$ decreased until the foil peeling surface 111 in contact with a first edge 311. Especially, contacting and rubbing the corner 31 between the first edge 311 and the second edge 312, the transversal line 1111 of the foil peeling surface 111 rotates around the Z-axis with the first preset value $\phi_1$ from the top view of the substrate 3 until in contact with the first edge 311 (as shown an arrow $\omega$). For example, at a period from time t4 to time t6, the foil peeling member 11 rotates around the Z-axis, such that the first preset value $\phi_1$ is decreased until the foil peeling surface 111 in contact with the first edge 311, that is, the transversal line 1111 in contact with the first edge 311. However, this example is not limited thereto, at the period from time t4 to time t6, the foil peeling member 11 may not rotate about the Z-axis to decrease the first preset value $\phi_1$ (as shown an arrow ω). In one embodiment, the transversal line 1111 of the foil peeling surface 111 is also in contact with the second edge 312 of the substrate 3.

Figure 17A:
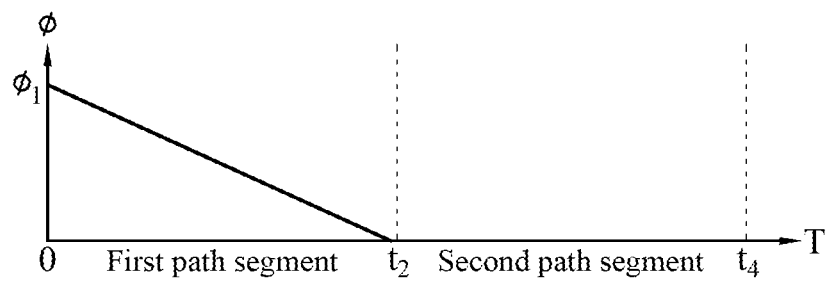
FIG. 17A illustrates a timing diagram (1) of a path of a fourth embodiment according to FIG. 1.
Figure 17B:
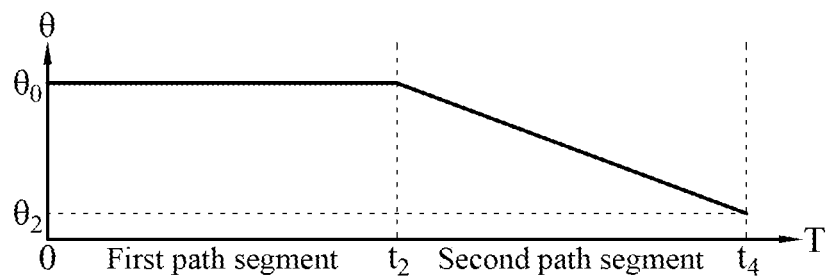
FIG. 17B illustrates a timing diagram (2) of a path of a fourth embodiment according to FIG. 1.

FIGS. 17A and 17B illustrate the fourth embodiment of the foil peeling member 11 moved along the path. FIG. 17A illustrates a timing diagram (1) of the path of the fourth embodiment according to FIG. 1. FIG. 17B illustrates a timing diagram (2) of the path of the fourth embodiment according to FIG. 1. As shown FIG. 10, when the foil peeling member 11 is moved along the first path segment, the first preset value $\phi_1$ is decreased to zero. For example, at a period from time t0 to time t2, the foil peeling member 11 rotates around Z-axis (as shown an arrow ω), such that the first preset value $\phi_1$ is decreased until the transversal line 1111 in contact with the first edge 311 of the substrate 3. However, this example is not limited thereto, the transversal line 1111 of the foil peeling surface 111 may not be in contact with the first edge 311 of the substrate 3, the foil peeling member 11 may not rotate around the Z-axis, or the first preset value $\phi_1$ may not be decrease to zero.

Figure 18A:
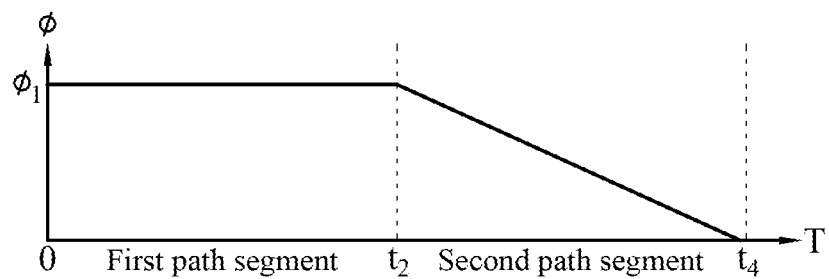
FIG. 18A illustrates a timing diagram (1) of a path of a fifth embodiment according to FIG. 1.
Figure 18B:
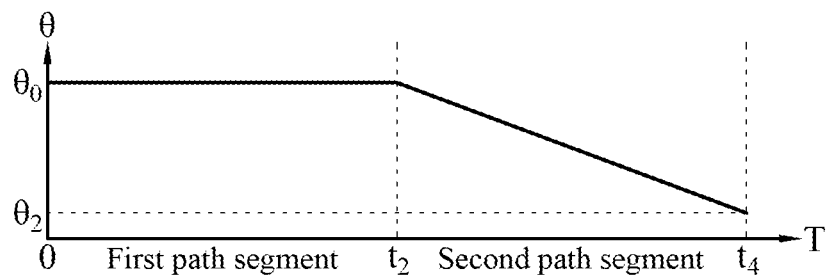
FIG. 18B illustrates a timing diagram (2) of a path of a fifth embodiment according to FIG. 1.

FIGS. 18A and 18B illustrate the fifth embodiment of the foil peeling member 11 moved along the path. FIG. 18A illustrates a timing diagram (1) of the path of the fifth embodiment according to FIG. 1. FIG. 18B illustrates a timing diagram (2) of the path of the fifth embodiment according to FIG. 1. When the foil peeling member 11 is moved along the second path segment, the first preset value $\phi_1$ is decreased to zero. For example, at a period from time t2 to time t4, the foil peeling member 11 rotates around Z-axis (as shown an arrow ω), such that the first preset value $\phi_1$ is decreased until the transversal line 1111 of the foil peeling surface 111 in contact with the first edge 311 of the substrate 3. However, this example is not limited thereto, the transversal line 1111 of the foil peeling surface 111 may not be in contact with the first edge 311 of the substrate 3, or the foil peeling member 11 may not rotate around the Z-axis, such that the first preset value $\phi_1$ may not be decrease to zero.

Figure 20A:
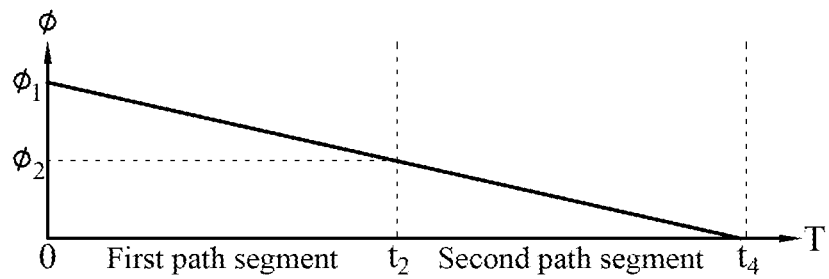
FIG. 20A illustrates a timing diagram (1) of a path of a sixth embodiment according to FIG. 1.
Figure 20B:
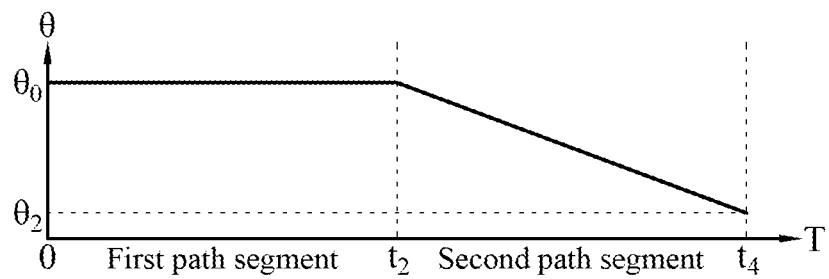
FIG. 20B illustrates a timing diagram (2) of a path of a sixth embodiment according to FIG. 1.

FIGS. 20A and 20B illustrate the sixth embodiment of the foil peeling member 11 moved along the path. As shown FIGS. 20A and 20B with FIGS. 9, 10 and 11, FIG. 20A illustrates a timing diagram (1) of the path of the sixth embodiment according to FIG. 1. FIG. 20B illustrates a timing diagram (2) of the path of the sixth embodiment according to FIG. 1. When the foil peeling member 11 is moved along the first path segment, the first preset value $\phi_1$ is decreased to the second preset value $\phi_2$. Next, the transversal line 1111 of the foil peeling surface 111 and the first edge 311 of the corner 31 intersect at a point to form the second preset value $\phi_2$. When the foil peeling member 11 is moved along the second path segment, the second preset value $\phi_2$ is decreased to zero. For example, at a period from time t0 to time t2, the foil peeling member 11 rotates around Z-axis (as shown an arrow ω), such that the first preset value $\phi_1$ is decreased to the second preset value $\phi_2$. Next, at a period from time t2 to time t4, the foil peeling member 11 keeps rotating around the Z-axis (as shown an arrow ω) to decrease the second preset value $\phi_2$ to zero after the first preset value $\phi_1$ is decreased to the second preset value $\phi_2$. Therefore, the transversal line 1111 of the foil peeling surface 111 is in contact with the first edge 311 of the substrate 3.

As shown FIG. 1 to FIG. 4, the foil peeing apparatus 1 further comprises a first foil clamping member 15 and a second foil clamping member 16. In the embodiment, the first foil clamping member 15 includes a first gripper 151, a first driver 152 and a joint unit 153. The joint 153 is connected between the first gripper 151 and the first driver 152 (such as motor or cylinder). The first gripper 151 is at least two cooperated parts, one of the cooperated parts is connected to the connector 12, and the other of the cooperated parts is connected to the join unit 153. In addition, the second foil clamping member 16 includes a second gripper 161 and a second driver 162, such as motor or cylinder. More specifically, the second gripper 161 is at least two cooperated parts, which are separately connected to the both sides of the second driver 162 in the X-axis direction.

Figure 12:
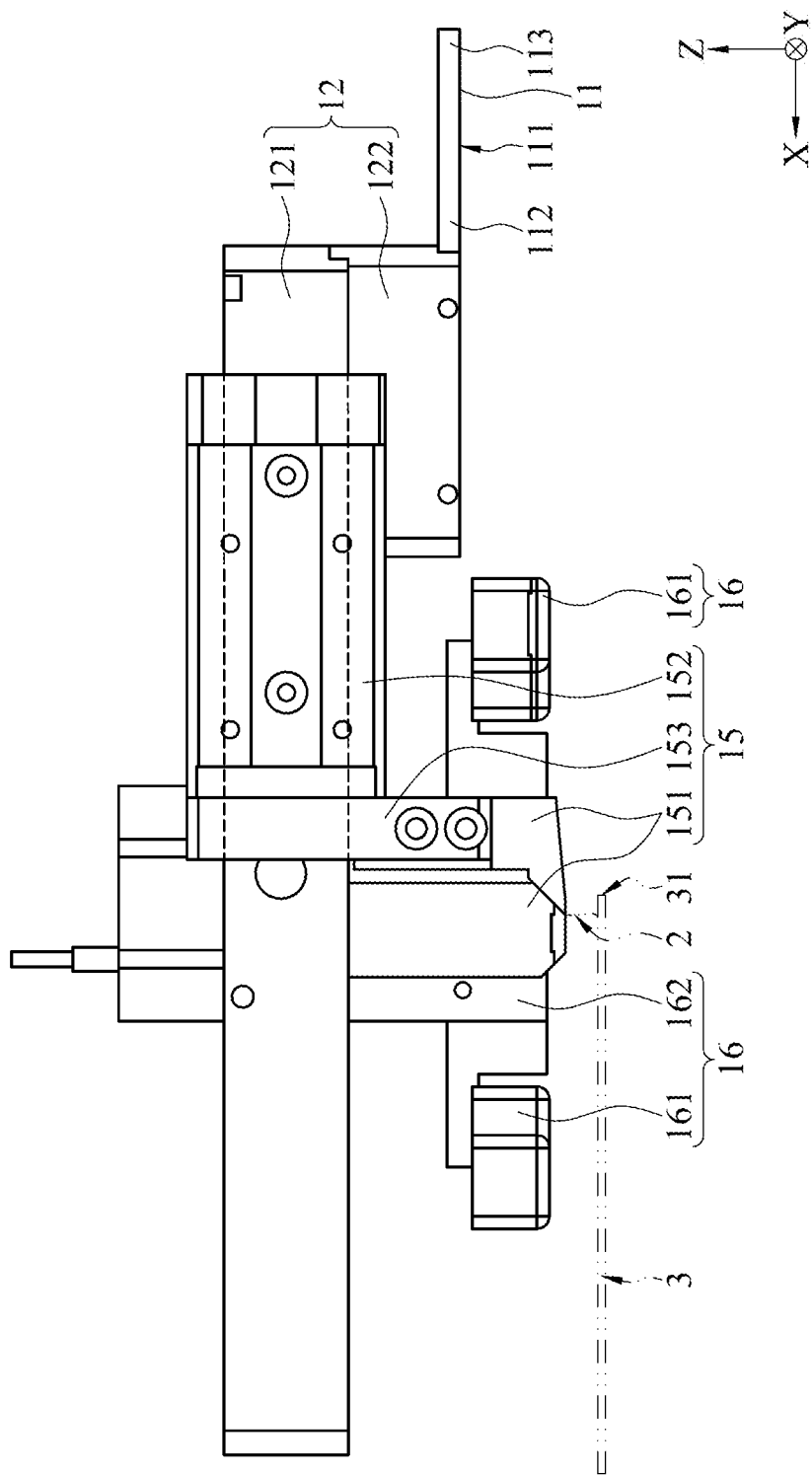
FIG. 12 illustrates a movement diagram of a first foil clamping member of the foil peeling apparatus according to FIG. 1.

Please refer to FIG. 12. FIG. 12 illustrates a movement diagram of the first foil clamping member of the foil peeling apparatus according to FIG. 1. In one embodiment, after the foil peeling member 11 moves at the destination point along the second path segment, the first foil clamping member 15 moves at the same destination point and grips the raised foil beneath. Next, the first foil clamping member 15 moves toward a first peeling direction, a direction upwards and toward another opposite corner opposite the corner 31 of the substrate 3 to peel the raised foil off the first surface of the substrate 3. More specifically, the destination point is that the foil peeling surface 111 close to the surface of the fixed end 112. For example, at time t4, the foil peeling member 11 stops at a halt position, that is, the foil peeling surface 111 close to the surface of the free end 113 stopped at the corner 31 or the substrate 3 above. Next, until parallel with the first surface of the substrate 3, the foil peeling member 11 rotates counterclockwise around the Y-axis with the first end 1211 of the main beam 121. Then, the first foil clamping member 15 grips around the position where the foil 2 is raised by the foil peeling member 11. At a period from time t4 to time t5, the foil peeling member 11 stops at the halt position above the substrate 3 to rotate until parallel with the substrate 3, and then the first foil clamping member 15 grips the raised foil 2 beneath. In the disclosure, the raised foil is that a portion of the foil 2 apart from the first surface of the substrate 3 and the rest of the foil 2 adhesive the first surface of the substrate 3. The peeled foil is that the foil 2 removed entirely from the first surface of the substrate 3.

Please refer to FIGS. 2 and 12, the first gripper 151 moves toward the first peeling direction, upwards and toward another opposite corner of the substrate 3 for the first peeling displacement, to the substrate 3 above. For example, after the first gripper 151 grips the raised foil, the first gripper 151 moves with the connector 12 from the corner 31 of the substrate 3 to another opposite corner of the substrate 3. When the foil peeling member 11 stops at the halt position above the substrate 3, the first gripper 151 moves upwards and toward another corner opposite the corner 31 of the substrate 3 or moves from the corner 31 to the centre of the substrate 3 above. Afterwards, the first foil clamping 15 moves sequentially from the centre of the substrate 3 to the first edge 311 above. In a similar way, the first foil clamping 15 also moves sequentially from the centre of the substrate 3 to the second edge 312 or another edge opposite the first edge 311 above. However, a distance between the two opposite edges or the two opposite corners is not limited to a shortest distance. In one embodiment, gripped by the first gripper 151, the raised foil moves the first peeling displacement, a distance from the corner 31 to another opposite corner of the substrate 3, until the raised foil is removed from the substrate 3. During the raised foil moving toward the first peeling displacement, a larger portion of the raised foil is greater than the corner of the raised foil gripped by the first gripper 151. In addition, the rest of the foil 2 adhesive on the substrate 3 is gradually raised by the first gripper 151 until being peeled the rest of the foil 2 off. For example, at a period from time t5 to time t6, gripped by the first gripper 151, the raised foil moves upwards and toward another opposite corner of the substrate 3, that is, another corner of the substrate 3 opposite the corner 31, until the rest of the foil 2 adhesive on the substrate 3 is peeled off.

Figure 13:
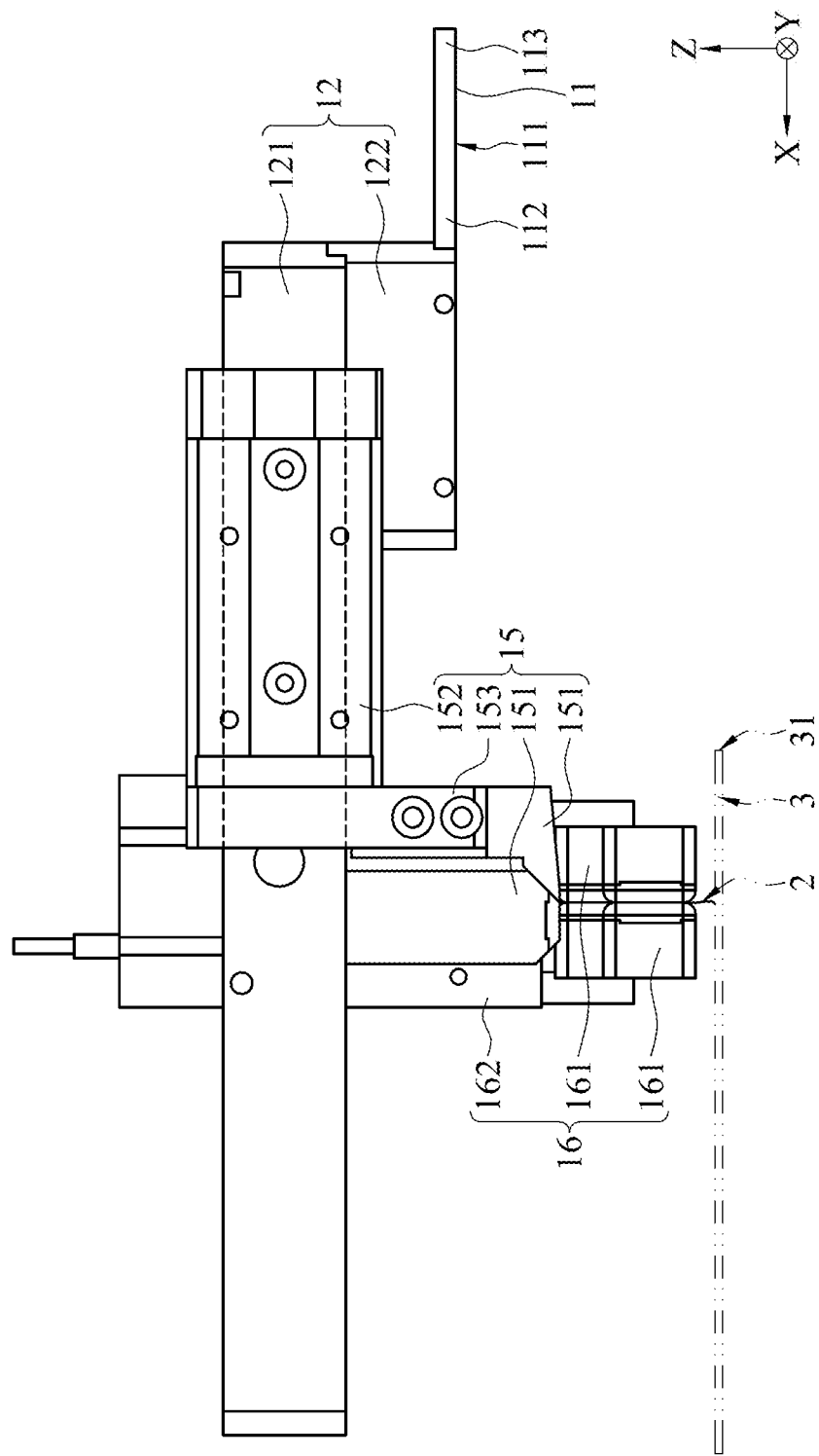
FIG. 13 illustrates a movement diagram of a second foil clamping member of the foil peeling apparatus according to FIG. 1.

Please refer to FIG. 13. FIG. 13 illustrates a movement diagram of a second foil clamping member of the foil peeling apparatus according to FIG. 1. When the corner of the raised foil is gripped by the first gripper 151, the rest of the foil 2 is raised and moved toward the first peeling direction. During the raised foil moving toward the first peeling direction, the raised foil is gradually larger than the corner of the raised foil, that is, a larger portion of the raised foil. In addition, when the second gripper 161 is between the first gripper 151 and the substrate 3, the large portion of the raised foil, gripped by the second gripper 161, moves toward the first peeling direction. In other words, the raised foil gripped by the first gripper 151 and the second gripper 161 moves toward the first peeling direction, until the rest of the foil adhesive on the substrate 3 being peeled off. Then, when the corner of the raised foil gripped by the first gripper 151 moves toward the first peeling direction, the larger portion of the raised foil between the first gripper 151 and the substrate 3 is gripped by the second gripper 161. Thus, raised by the first gripper 151 and the second gripper 161, the rest of the foil adhesive on the substrate 3 moves toward another corner opposite the corner 31 until the rest of the foil 2 being peeled off. For example, after the first gripper 151 grips the corner of the raised foil 2 at time t6 to move toward the first peeling direction for the first peeling displacement, the large portion of the raised foil 2 is greater than the rest of the foil 2. At a period from time t6 to time t7, the second gripper 161 grips the larger portion of the raised foil 2 between the first gripper 151 and the substrate 3 and moves toward the first peeling direction until the rest of the foil 2 being entirely peeled off the first surface of the substrate 3.

In one embodiment, in contrast to the second foil clamping member 16 connected to the arm member 123 with the first foil clamping member 15, the second foil clamping member 16 is connected to one arm member 123 when the first foil clamping member 15 is connected to another arm member 123. More specifically, the connector 12 includes a polarity of arm members 123, one of the arm members 123 is connected to the first foil clamping member 15, and another of the arm members 123 is connected to the second foil clamping member 16. Gripping the corner of the raised foil, the first gripper 151 moves toward the first peeling direction for the first peeling displacement, a distance the gripped raised foil moves, such that the raised foil is gradually larger than the corner of the raised foil and the rest of the foil 2 is gradually raised by the first gripper 151. Once the larger portion of the raised is gripped by the second gripper 161, the raised foil moves toward the first peeling direction with the first gripper 151 and the second gripper 161. Therefore, the first foil clamping member 15 as well as the second foil clamping member 16 grip the raised foil upwards and toward another corner opposite the corner 31 of the substrate 3 until the rest of the foil being entirely peeled off the first surface of the substrate 3.

In one embodiment, the foil peeling apparatus 1 includes but not limits to a first foil clamping member 15 and a second foil clamping member 16, also the foil peeling apparatus 1 includes a plurality of foil clamping members.

In one embodiment, the foil peeling apparatus 1 includes but not limits to a foil peeling member 11, also the foil peeling apparatus 1 includes a plurality of foil peeling members.

In one embodiment, the foil peeling apparatus 1 includes but not limits to an arm member 123, also the foil peeling apparatus 1 includes a plurality of arm members.

As mentioned above, the disclosure provides a foil-peeling apparatus 1 adapted to peel the foil 2 on the first surface of the substrate 3. When the controller 13 controls the connector 12 to move along the path, the foil peeling member 11 contacts and rubs the foil 2 on the first surface of the substrate 3 so as to peel the foil 2 off the substrate 3.

When the disclosure disclosed in the above detailed description, features and advantages of the embodiment by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A foil peeling apparatus, adapted to peel a foil on a first surface of a substrate, the substrate having a corner between a first edge and a second edge from a top view of the substrate, the foil peeling apparatus comprising:
    a foil peeling member having a foil peeling surface;
    a connector, connected to the foil peeling member; and
    a controller, configured for controlling the connector to move the peeling member along a path, the path comprising:
        a first path segment, when the foil peeling member is moved along the first path segment, the foil peeling surface in contact with, with an initial angle between the foil peeling surface and the first surface from a side view, the corner, and then the foil peeling member moved toward a first feeding direction for a first feeding displacement, wherein the initial angle is between the foil peeling surface and the first surface, from the side view of the substrate, and the first feeding direction is upwards and toward the substrate; and
        a second path segment, connected to the first path segment, when the foil peeling member is moved along the second path segment, the foil peeling member moves toward a second feeding direction for a second feeding displacement and the initial angle being decreased to a second feeding angle, wherein the second feeding direction is upward and toward the substrate and the second feeding angle is, from the side view of the substrate, between the foil peeling surface and the first surface.

2. The foil peeling apparatus according to claim 1, wherein
    after the foil peeling member is moved along the first feeding direction for the first feeding displacement, the initial angle is decreased to a first feeding angle between the foil peeling surface and the first surface, and
    when the foil peeling member is moved along the second path segment, an angle between the foil peeling surface and the first surface is decreased from the first feeding angle to the second feeding angle.

3. The foil peeling apparatus according to claim 2, wherein the first feeding displacement is not less than 0 mm and not greater than 1 mm; and the first feeding angle is from 25° to 60°.

4. The foil peeling apparatus according to claim 3, wherein the second feeding displacement is greater than 1 mm and not greater than 8 mm; and the second feeding angle is from 25° to 60°.

5. The foil peeling apparatus according to claim 1, wherein before the foil peeling surface is in contact with the surface of the corner, a default distance between the foil peeling surface and the corner from the side view of the substrate is 0 mm to 1.5 mm.

6. The foil peeling apparatus according to claim 1, wherein, from the top view of the substrate, a first edge angle between the foil peeling surface and the first edge is decreased to zero when the foil peeling member is moved along the first path segment.

7. The foil peeling apparatus according to claim 1, wherein, from the top view of the substrate, a first edge angle between the foil peeling surface and the first edge is decreased to zero when the foil peeling member is moved along the second path segment.

8. The foil peeling apparatus according to claim 1, wherein, from the top view of the substrate, a first edge angle is between the foil peeling surface and the first edge; and
the path further comprises a third path segment, connected to the second path segment, wherein,
when the foil peeling member is moved along the third path segment, the first edge angle is decreased to zero.

9. The foil peeling apparatus according to claim 1, wherein a top edge angle is between the foil peeling surface and the first edge from the top view of the substrate,
when the foil peeling member is moved along the first path segment, the top edge angle is decreased from a first preset value to a second preset value; and
when the foil peeling member is moved along the second path segment, the top edge angle is decreased from the second preset value to zero.

10. The foil peeling apparatus according to claim 1, wherein a default length is from an original point of the first path segment to a destination point of the second path segment, wherein
the original point is on an area of the foil peeling surface close to a fixed end of the foil peeling member, and
the destination point is on another area of the foil peeling surface close to a free end of the foil peeling member.

11. The foil peeling apparatus according to claim 10, wherein the default length is between 10 mm and 40 mm.

12. The foil peeling apparatus according to claim 1, further comprising:
a first foil clamping member having a first gripper and connected to the connector;
wherein, after the foil peeling member is moved along the second path segment, the controller controls the first gripper to grip around a position where the foil is raised by the foil peeling member, and then moves the first gripper toward a first peeling direction for a first peeling displacement, wherein the first peeling displacement is upwards and toward another corner opposite the corner of the substrate.

13. The foil peeling apparatus according to claim 12, wherein
the foil peeling apparatus comprising a second foil clamping member, having a second gripper; and
the connector comprising two arm members, one arm member connected to the first foil clamping member and another arm member connected to the second foil clamping member, wherein the controller controls the one arm member to move the first gripper to grip at the position, the controller controls the another arm member to move the second gripper to grip between the position and the substrate.

14. The foil peeling apparatus according to claim 13, wherein the controller controls the first gripper and the second gripper to move toward another corner opposite the corner of the substrate after the controller controls the first gripper and the second gripper to grip.

15. The foil peeling apparatus according to claim 12, further comprising:
a second foil clamping member connected to the connector, and the second foil clamping member having a second gripper, wherein the controller controls the second gripper to grip between the first gripper and the substrate, and controls the first gripper and the second gripper to move toward another corner opposite the corner of the substrate after the first gripper is moved toward the first peeling direction for the first peeling displacement.

16. The foil peeling apparatus according to claim 15, wherein the connector comprises:
an arm member, connected to the controller;
a main beam, having a first end and a second end in a longitudinal direction, the second end connected to the arm member; and
a fixed member connected to the first end and the foil peeling member, wherein the controller controls the arm member to move the first clamping member to the position after the foil peeling member is moved along the second path segment.

17. The foil peeling apparatus according to claim 12, wherein the connector comprises:
a main beam, having a first end and a second end in a longitudinal direction;
a fixed member, connected to the first end;
the foil peeling member connected to the first end by the fixed member; and
the arm member connected to the second end, wherein the controller controls the arm member to move the first foil clamping member to the position.

* * * * *